UNITED STATES PATENT OFFICE.

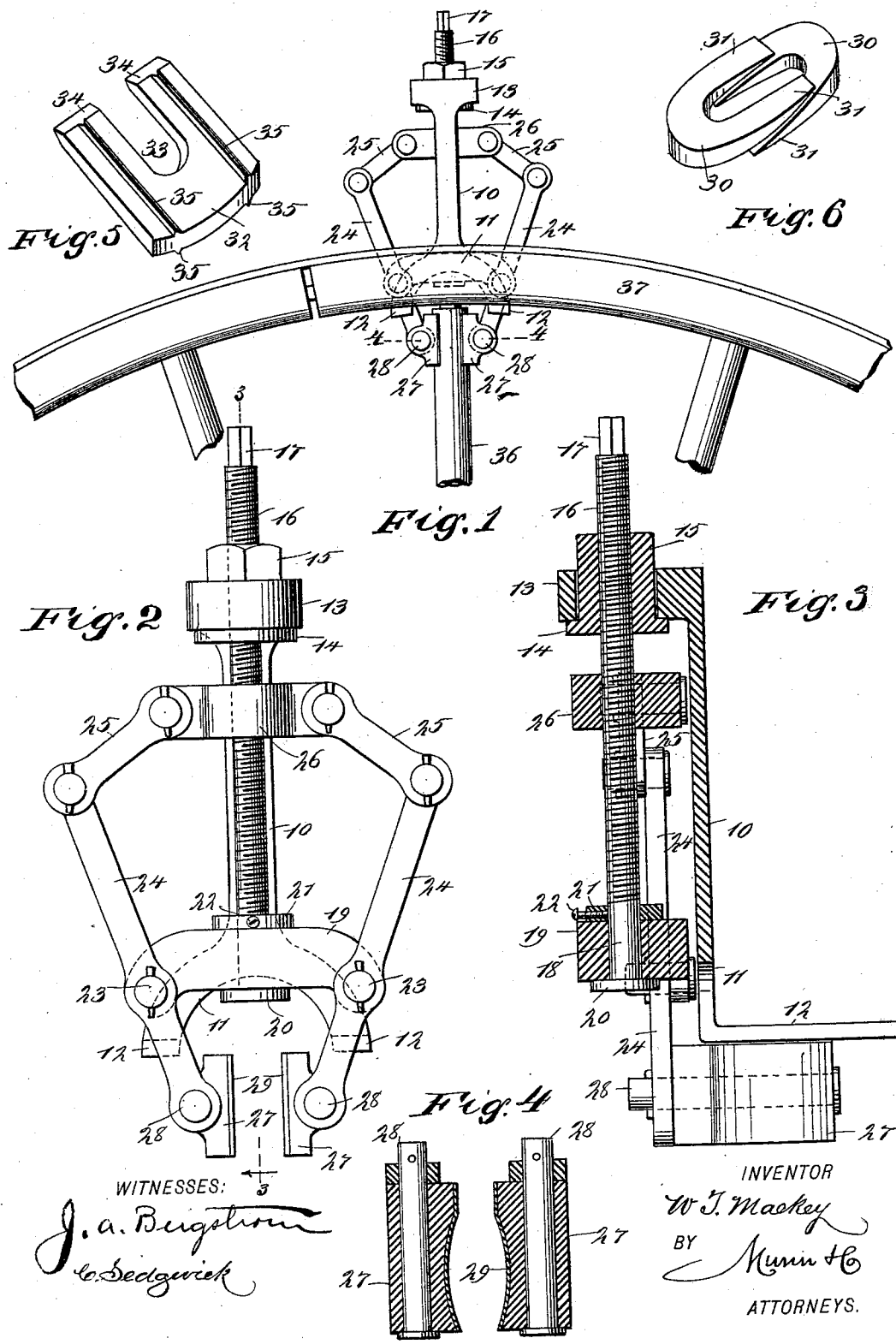

WILLIAM T. MACKEY, OF VANCOUVER, CANADA, ASSIGNOR OF THREE-FIFTHS TO JOHN W. WEART AND ARCHIBALD B. DOCKSTEADER, OF SAME PLACE.

TIRE-TIGHTENER.

SPECIFICATION forming part of Letters Patent No. 521,661, dated June 19, 1894.

Application filed September 26, 1893. Serial No. 486,522. (No model.)

*To all whom it may concern:*

Be it known that I, WILLIAM T. MACKEY, of Vancouver, British Columbia, Canada, have invented certain new and useful Improvements in Tightening Wheel-Tires, of which the following is a full, clear, and exact description.

My invention relates to improvements in an improved means for tightening wheel tires, or rather expanding the wheels so that they will fit snugly within the tires; and the object of my invention is to provide means for expanding the wheels after they have shrunken and become loose in the tires, so that they will snugly fill the tires, and also to provide means for holding the wheels in this expanded position or shape.

A further object of my invention is to produce a very simple and powerful screw-actuated apparatus, which may be conveniently clamped to a spoke of a wheel and applied to the felly thereof, so as to pull out the felly in relation to the spoke and separate the ends of the felly sections.

To these ends my invention consists of a method of expanding wheels within their tires, and a device for causing such expansion, which method and device will be hereinafter described and claimed.

Reference is to be had to the accompanying drawings, forming a part of this specification, in which similar figures of reference indicate corresponding parts in all the views.

Figure 1 is a broken side elevation of a wheel having my expanding device applied thereto, and showing the felly separated from one of the spokes and the ends of the felly sections also separated. Fig. 2 is a rear elevation of the expanding device. Fig. 3 is a longitudinal section on the line 3—3 of Fig. 2. Fig. 4 is a cross section on the line 4—4 of Fig. 1. Fig. 5 is a detail perspective view of the slotted wedge which is adapted to enter between two felly sections so as to fill the intervening space; and Fig. 6 is a perspective view of two of the half washers which are adapted to fill the space between the end of a spoke and the adjacent felly and to be clamped around the tenon of the spoke.

The device for expanding the wheel is provided with a lifter having a bar 10 which at its lower end is forked, as shown at 11, and terminates in outwardly extending parallel arms 12 which are adapted to be placed beneath a felly so that when the lifter is raised or forced outward in relation to the wheel hub, it will lift up the felly and raise the latter from the spoke. The upper end of the lift bar terminates in a laterally extending collar 13, which incloses a nut 15 which turns freely in the collar, and the nut has a flange 14 at its lower end to abut with the under side of the collar. The upper end of the nut projects above the collar and is squared or faceted so as to receive a wrench. The nut 15 fits a screw 16 which extends parallel with the lift bar 10 and has its upper end squared, as shown at 17, to fit a wrench, while its lower end portion is cylindrical and smooth, as shown at 18, in order that it may turn freely in the tie bar 19 through which it projects and to which it is held by means of its head 20 and a collar 21, which is on the lower portion of the screw and is held in place by a set screw 22. The tie bar 19 connects two of the toggle levers and its outer ends are pivoted, as shown at 23, to the longer toggle levers 24 which are arranged opposite each other, and the studs 23 on which they are pivoted serve as their fulcrums. The levers 24 are pivoted to two short levers or links 25 which are in turn pivoted to opposite ends or sides of the follower 26 which is mounted on the screw 16 and which is internally screw threaded to fit the thread of the screw. The lower ends of the levers 24 carry the clamping jaws 27 which are adapted to be clamped to the spokes of a wheel and which are connected to the levers by means of suitable pins 28, or equivalent devices, each jaw having its inner face concave and provided with a packing 29 which is of some yielding material such as leather or rubber, so that it will not injure the spokes with which it is brought in contact.

After the device has been applied to the spokes and felly of a wheel, as hereinafter described, and the wheel has been expanded, as shown in Fig. 1, so as to slightly remove the felly from the spokes and to separate the felly sections, a split washer is inserted between the ends of the spokes and the felly so as to fill the space and prevent the felly from dropping back to place, and this washer comprises two half washers 30, the members 31 of which taper toward the ends, and these half washers are of a horseshoe shape, that is, they are slightly elongated so that they may be pushed together from opposite sides of a spoke, and they will embrace the spoke tenon and when driven home they will form practically a solid washer of uniform thickness.

To fill the space between the felly sections, a wedge plate 32 is used which has a slot 33 extending from one end toward the center, this being adapted to slide over the tenon of the felly sections, and the wedge plate has also terminal edges 34 which enable it to be easily driven, and it has on opposite sides ribs 35 which are adapted to be embedded in the ends of the felly sections and which thus serve to prevent the displacement of the wedge plate.

The device is applied to a wheel and the latter expanded in the following way:—The device is placed opposite the felly of the wheel, with the jaws 27 on opposite sides of one of the spokes 36 and with the arms 12 of the lifter projecting beneath the felly 37; a wrench is then applied to the screw 17 and the screw is turned so as to force down the follower 26, and this carries down the inner ends of the links or levers 25 and throws out their lower or outer ends, which acting on the levers 24 causes the lower ends of the levers 24 to be forced toward each other, thus clamping the jaws 27 firmly against the spoke 36. The wrench is then applied to the nut 15 which is turned so as to rise on the screw 16 and in so doing it lifts the collar 13, lift bar 10 and arms 12, and the latter pull the felly 37 from the spoke 36 so as to cause the felly to be held tight against the tire.

In lifting the felly, as described, the felly sections are separated, as shown in Fig. 1, and while the lifting device is still in position the spoke washers and the wedge plate are applied in the manner already described, so as to hold the wheel in its expanded shape, after which the expanding tool may be removed and applied to another portion of the wheel, the operation above described being performed on several portions of the wheel so as to cause the wheel to be evenly and thoroughly expanded.

Having thus fully described my invention, I claim as new and desire to secure by Letters Patent—

1. A device for expanding vehicle wheels, which comprises jaws for clamping a spoke, devices for actuating said jaws to cause them to simultaneously approach or recede from each other, a screw which operates said devices, a lifter adapted to engage the under side of the felly, and a nut which connects the lifter with the aforesaid screw, as shown and described.

2. The herein-described device for expanding wheels, which comprises a lift bar having arms to project beneath the felly, clamping jaws to engage a spoke adjacent to the felly, toggle levers to operate the jaws, a screw for actuating the toggle levers, and an operative connection between the screw and the lift bar, whereby the latter may be moved in relation to the jaws, substantially as described.

3. A device for expanding wheels, comprising an adjusting screw, a lift bar operatively connected with the screw and provided with projecting arms to engage a felly, a follower mounted on the screw, a pair of jaws to clamp a wheel spoke, toggle levers connecting the follower with the jaws, and a tie bar mounted loosely on the screw and connecting two of the toggle levers, substantially as described.

4. A wheel expander, comprising an adjusting screw, a nut on the screw, a lifter journaled on the nut and provided with projecting arms to engage a felly, a tie bar journaled on the lower end of the screw, a follower threaded on the screw, toggle levers connecting the follower and tie bar, two of the levers being fulcrumed on the latter, and oppositely arranged jaws carried by toggle levers and adapted to clamp the spoke, substantially as described.

WILLIAM T. MACKEY.

Witnesses:
WARREN B. HUTCHINSON,
C. SEDGWICK.